United States Patent [19]

Clegg

[11] Patent Number: 4,627,692

[45] Date of Patent: Dec. 9, 1986

[54] LOUVERED CONICAL BEAM CONCENTRATOR RT:C

[76] Inventor: John E. Clegg, 2320 Keystone Dr., Orlando, Fla. 32806

[21] Appl. No.: 743,831

[22] Filed: Jun. 12, 1985

[51] Int. Cl.[4] ............................................. G02B 13/18
[52] U.S. Cl. ................................................ 350/432
[58] Field of Search ................................... 350/432

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |
| 4,492,438 | 1/1985 | Clegg | 350/432 |
| 4,492,439 | 1/1985 | Clegg | 350/432 |
| 4,521,085 | 6/1985 | Clegg | 350/432 |
| 4,575,196 | 3/1986 | Clegg | 350/432 |

*Primary Examiner*—John K. Corbin
*Assistant Examiner*—Rebecca D. Gass

[57] ABSTRACT

A conical beam concentrator consisting of a series of six component lenses which receive a convergent conical beam of diffused sunlight and emit a concentrated circular whole beam. There are six annular lenses aligned on the veritcal optic axis, as follows; an upper lens with a convex conical section which forms the apex of the concentrator, and five lower lenses with inset convex conical sections of graduated increased diameters. Each lens consists of twelve sections separated by radial walls which are covered by an opaque coating of paint which intercepts radiation not perpendicular to the convex conical sections of the lenses. The upper and lower conical walls of each lens are also covered by an opaque layer of paint to intercept extraneous radiation.

1 Claim, 4 Drawing Figures

LOUVERED CONICAL BEAM CONCENTRATOR RT:C

BACKGROUND

Prior art includes the Conical Beam Concentrator RT:C, U.S. Pat. No. 4,575,196, by this inventor. This concentrator consists of six annular sectional lenses which are integrally adjoined to form one lens. Metal louvers mounted outside the concentrator must be used to intercept radiation which is extraneous to the perpendicular incipient beam.

The code designation of the louvered conical beam concentrator is RT:C (R—refracting section of a component lens, T—transmitting section of a component lens, and C—concentrating lens).

DRAWINGS

DESCRIPTION

Figure 1:
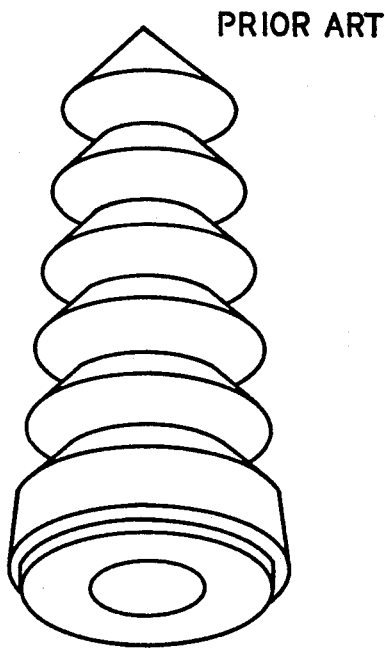
FIG. 1 is a perspective view of the patented conical beam concentrator with integral sectional lenses.

FIG. 1 is a perspective view of the Conical Beam Concentrator RT:C, U.S. Pat. No. 4,575,196, by this inventor. This concentrator consists of six integral sectional lenses.

Figure 2:
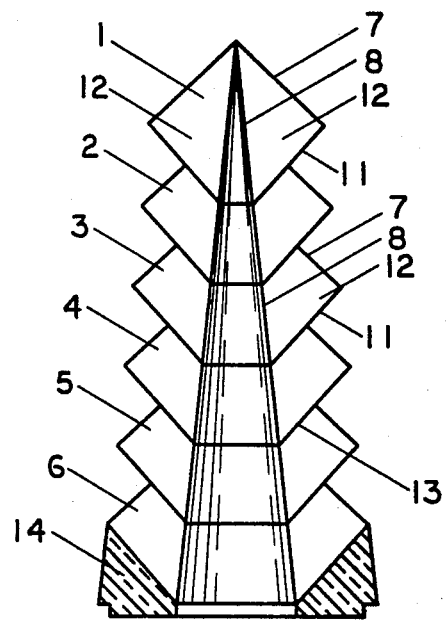
FIG. 2 is a longitudinal section of the louvered conical beam concentrator with component lenses.
Figure 3:
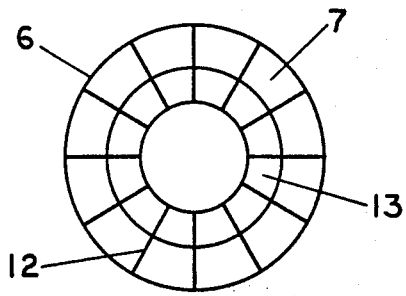
FIG. 3 is a top view of the bottom component lens of the louvered conical beam concentrator showing the twelve radial sections.
Figure 4:
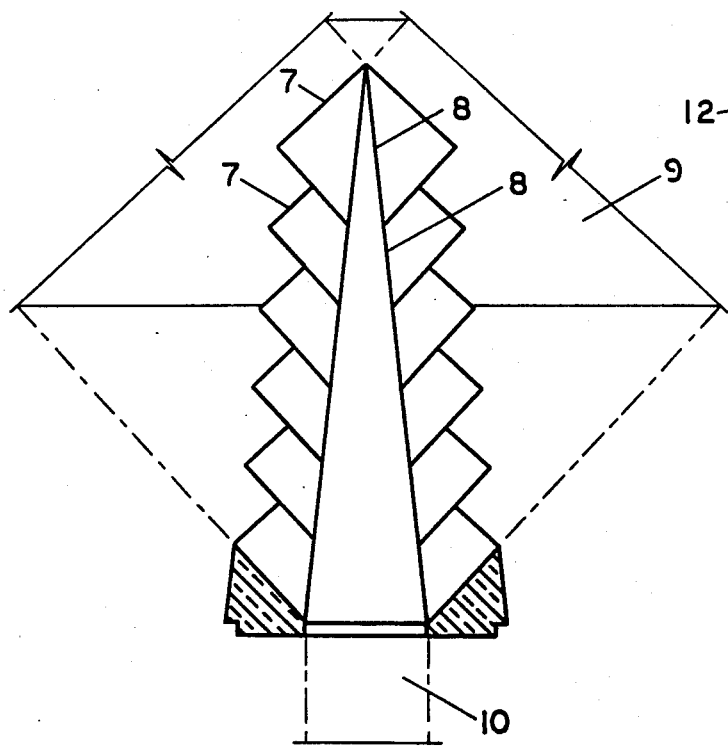
FIG. 4 is a longitudinal section of the louvered beam concentrator with a ray diagram.

FIG. 2 is a longitudinal section of the louvered conical beam concentrator RT:C comprising six component lenses 1-6 aligned on the vertical optic axis of the concentrator. Each component lens 1-6 has a convex conical section 7 and a concave conical section 8. Section 7 receives and transmits a convergent conical incipient beam 9 of diffused sunlight, and section 8 refracts beam 9, forming a concentrated circular whole beam 10 which is emitted parallel to the vertical optic axis as in FIG. 4.

Upper component lens 1 has a convex conical section 7 which forms the apex of the concentrator, a concave conical section 8, an opaque lower convex conical wall 11, and twelve opaque radial walls 12 occupying vertical planes inclined at angles of 30°.

Lower component lenses 2-6 have a convex conical section 7, a concave conical section 8, twelve opaque radial walls 12, and two opaque opposed parallel upper concave conical wall 13 and lower convex conical walls 11.

All opaque walls intercept radiation from outside the convergent conical incipient beam 9 which is received by the convex conical sections 7.

The widths of upper concave conical walls 13 measured from the edge of convex conical section 7 to the edge of concave conical section 8 are equal in component lenses 2-6.

The widths of lower convex conical walls 11 measured from the edge of convex conical section 7 to the edge of concave conical section 8 are equal in all component lenses 1-6.

The widths of convex conical sections 7 are equal in component lenses 2-6.

The widths of concave conical sections 8 are equal in component lenses 2-6.

Component lens 6 is mounted in annular base 14.

I claim:

1. A louvered conical beam concentrator RT:C comprising six component lenses (1-6) aligned on the vertical optic axis of the concentrator and mounted on an annular base (14);

upper component lens (1) having a convex conical section (7) which forms the apex of the concentrator, a concave conical section (8), an opaque lower convex conical wall (11), and twelve opaque radial walls (12), lower component lenses (2-6) each having a convex conical section (7), a concave conical section (8), an opaque lower convex conical wall (11), twelve opaque radial walls (12), and an upper concave conical wall (13) parallel and opposed to lower wall (11), said convex conical sections (7) being so disposed as to receive and transmit a convergent conical incipient beam (9) of diffused sunlight, and said concave conical sections (8) being so disposed as to receive and refract beam (9), forming a concentrated circular whole beam (10) which is emitted parallel to the vertical optic axis.

* * * * *